US012406646B2

(12) United States Patent
Hiramatsu et al.

(10) Patent No.: US 12,406,646 B2
(45) Date of Patent: Sep. 2, 2025

(54) ELECTRONIC DEVICE, ELECTRONIC DRUM DEVICE AND SOUND REPRODUCTION METHOD

(71) Applicant: YAMAHA CORPORATION, Hamamatsu (JP)

(72) Inventors: Mikihiro Hiramatsu, Hamamatsu (JP); Hideaki Takehisa, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 736 days.

(21) Appl. No.: 17/526,236

(22) Filed: Nov. 15, 2021

(65) Prior Publication Data

US 2022/0157286 A1 May 19, 2022

(30) Foreign Application Priority Data

Nov. 17, 2020 (JP) ................................ 2020-191257

(51) Int. Cl.
*G10H 3/14* (2006.01)

(52) U.S. Cl.
CPC ....... *G10H 3/146* (2013.01); *G10H 2210/131* (2013.01); *G10H 2230/275* (2013.01)

(58) Field of Classification Search
CPC ............ G10H 3/146; G10H 2210/131; G10H 2230/275; G10H 2210/005; G10H 2240/325; G10H 1/361; G10H 1/42
See application file for complete search history.

(56) References Cited

U.S. PATENT DOCUMENTS

2017/0256246 A1 9/2017 Maezawa et al.

FOREIGN PATENT DOCUMENTS

| | | | |
|---|---|---|---|
| CN | 101983403 | A | 3/2011 |
| EP | 2261896 | A1 | 12/2010 |
| JP | S6349784 | A | 3/1988 |
| JP | 2011013520 | A | 1/2011 |
| JP | 2016099512 | A | 5/2016 |
| JP | 2018146682 | A | 9/2018 |

OTHER PUBLICATIONS

Oldmeadow (https://www.youtube.com/watch?v=C8DhUXZDEKs, posted Sep. 3, 2019, retrieved Aug. 8, 2024) (Year: 2019).*
Buell (https://www.youtube.com/watch?v=68rcgxq-v_0, posted Sep. 27, 2018, retrieved Aug. 8, 2024) (Year: 2018).*
(Continued)

*Primary Examiner* — Dedei K Hammond
*Assistant Examiner* — Philip G Scoles
(74) *Attorney, Agent, or Firm* — ROSSI, KIMMS & McDOWELL LLP

(57) ABSTRACT

An electronic device according to an embodiment of the present disclosure includes at least one memory configured to store executable instructions, and a processor configured to execute the executable instructions stored in the at least one memory to cause the electronic device to acquire a first sound signal from an external source, generate a musical sound signal according to a performance operation, output the first sound signal and the musical sound signal to a first output destination, and output the musical sound signal to a second output destination different from the first output destination.

12 Claims, 10 Drawing Sheets

(56) References Cited

OTHER PUBLICATIONS

Roland (https://static.roland.com/assets/media/pdf/SPD-SX_eng04_W.pdf, copyright 2011, retrieved Aug. 8, 2024) (Year: 2011).*
Office Action issued in Chinese Appln. No. 202111353033.0, dated Nov. 13, 2024. English translation provided.
Second Office Action issued in Chinese Appln. No. 202111353033.0 mailed May 28, 2025. English machine translation provided.
Notice of Reasons for Refusal issued in Japanese Appln. No. 2021-186304 mailed Jun. 17, 2025. English machine translation provided.

* cited by examiner

10

ELECTRONIC DEVICE, ELECTRONIC DRUM DEVICE AND SOUND REPRODUCTION METHOD

CROSS-REFERENCE TO RELATED APPLICATIONS

This application is based upon and claims the benefit of priority from the prior Japanese Patent Application No. 2020-191257, filed on Nov. 17, 2020, the entire contents of which are incorporated herein by reference.

FIELD

The present disclosure relates to an electronic device for outputting sound, an electronic drum device, and a sound reproduction method.

BACKGROUND

In an electronic musical instrument, backing sounds of a musical piece are output simultaneously with sounds corresponding to performances by a performer. A performer sometimes plays based on a click sound (guide sound) to play along with backing sounds (for example, Japanese laid-open patent publication No. 2011-013520).

SUMMARY

An electronic device according to an embodiment of the present disclosure includes at least one memory configured to store executable instructions, and a processor configured to execute the executable instructions stored in the at least one memory to cause the electronic device to acquire a first sound signal from an external source; to generate a musical sound signal according to a performance operation, to output the first sound signal and the musical sound signal to a first output destination, and to output the musical sound signal to a second output destination different from the first output destination.

An electronic device according to another embodiment of the present disclosure includes at least one memory configured to store executable instructions, and a processor configured to execute the executable instructions stored in the at least one memory to cause the electronic device to acquire a first sound signal from an external source; to generate a musical sound signal according to a performance operation, to output the first sound signal and the musical sound signal to a first output destination, to output the first sound signal, a second sound signal corresponding to the first sound signal and the musical sound signal to a second output destination difference from the first output destination, and to adjust an output timing of the first sound signal and an output timing of the second sound signal.

An electronic drum device according to another embodiment of the present disclosure includes one or more pads, each of the one or more pads having a striking surface, and the electronic device is configured to generate the musical sound signal in response to the performance operation to being received by the striking surface of the one or more pads.

A sound reproduction method according to another embodiment of the present disclosure includes acquiring a first sound signal from an external source, generating a musical sound signal according to a performance operation, outputting the first sound signal and the musical sound signal to a first output destination, and outputting the musical sound signal to the second output destination different from the first output destination.

A sound reproduction method according to another embodiment of the present disclosure includes acquiring a first sound signal from an external source, generating a musical sound signal according to a performance operation, outputting the first sound signal and the musical sound signal to a first output destination, outputting the first sound signal, a second sound signal corresponding to the first sound signal and the musical sound signal to a second output destination different from the first output destination, and adjusting an output timing of the first sound signal and an output timing of the second sound signal, wherein the first sound signal is a backing sound signal, and the second sound signal is a click sound signal.

DESCRIPTION OF EMBODIMENTS

First Embodiment

Figure 1:
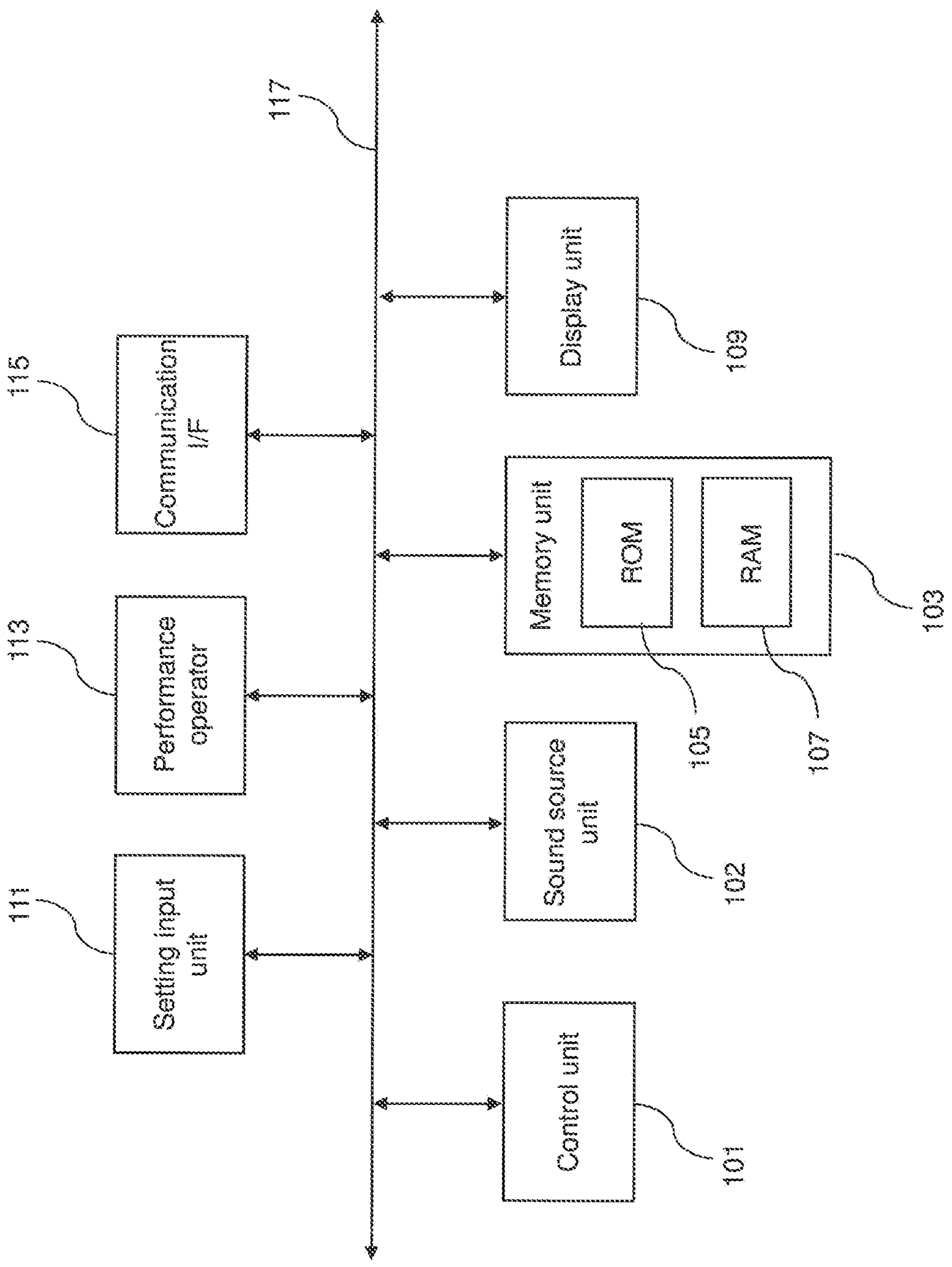
FIG. 1 is a block diagram illustrating a configuration of an electronic musical instrument according to a first embodiment.

Hereinafter, an electronic musical instrument according to an embodiment of the present disclosure will be described in detail with reference to the drawings. The following embodiments are examples of embodiments of the present disclosure, and the present disclosure is not to be construed as being limited to these embodiments. In the drawings referred to in the present embodiments, the same portions or portions having similar functions are denoted by the same symbols or similar symbols (symbols each formed simply by adding A, B, etc. to the end of a number), and a repetitive description thereof may be omitted.

[Configuration of Electronic Musical Instrument]

FIG. 1 is a block diagram illustrating a configuration of an electronic musical instrument 10 according to the first embodiment of the present disclosure. The electronic musical instrument 10 is a device having a function of outputting sounds in response to a performance operation by a performer, and outputting click sounds and backing sounds in accordance with performance data stored in advance or performance data acquired from an external source. In the present embodiment, a case where the electronic musical instrument 10 is an electronic drum device will be described as an example.

The electronic musical instrument 10 includes a control unit 101, a sound source unit 102, a memory unit 103, a display unit 109, a setting input unit 111, a performance operator 113, and a communication I/F 115. These units are connected to each other by a bus 117.

The control unit 101 includes a CPU for controlling operation of the entire electronic musical instrument 10. The control unit 101 implements control programs stored in the memory unit 103, controls hardware constituting the electronic musical instrument 10, and realizes various functions in the electronic musical instrument. The functions implemented include the generation and output of sound signals. The generation and output of sound signals is based on the user input to the setting input 111 and the detection of an operation on the performance operator 113.

The sound source unit 102 controls sound generation based on an instruction signal from the control unit 101. The sound source unit 102 includes a DSP (Digital Signal Processor). The detailed configuration of the sound source unit 102 will be described later.

The memory unit 103 includes a ROM 105 and a RAM 107. Various control programs implemented by the CPU and various table data to be referred to when the CPU implements a predetermined control program are readable and stored in the ROM 105. The ROM 105 also stores sound waveform data for each type of the performance operator 113. The RAM 107 is used as a working memory for temporarily storing various data and the like generated when the CPU implements a predetermined control program. The RAM 107 is also used as a memory for temporarily storing currently running control programs and related data. Various application programs and various related data may be stored in the memory unit 103.

The display unit 109 is a display device such as a liquid crystal display or an organic EL display. The display unit 109 displays a screen based on the control by the control unit 101 to the user.

The setting input unit 111 is an operator for accepting setting operations for the electronic musical instrument 10 from the user, and includes various keys, buttons, rotary encoders, sliders, and the like. In a case where the display unit 109 includes a touch panel, the touch panel may function as the setting input unit 111.

The performance operator 113 is an operator for accepting performance operations on the electronic musical instrument 10 from a performer. In the present embodiment, a case where the electronic musical instrument 10 is an electronic drum device will be described as an example. Therefore, the performance operator 113 is composed of a snare pad simulating a snare drum, a tam pad simulating a floor tam, a kick pad simulating a bass drum (kick pedal switch), a ride cymbal pad and a crash cymbal pad simulating a ride cymbal and a crash cymbal, a high-hat cymbal pad and a high-hat pedal switch simulating a high-hat cymbal, and the like.

The communication I/F 115 is an interface for performing data communication with an external device. Any standard, whether wired or wireless, can be adopted. The communication method may be network communication. The function of the memory unit 103 may be realized by an external device capable of communicating by the communication I/F 115.

Japanese laid-open patent publication No. 2011-013520 discloses an electronic musical instrument that generates backing sounds and click sounds based on performance information input from an external device. However, in a case where backing sounds and click sounds are output from two or more different output units such as earphones and speakers worn by a performer, the electronic musical instrument disclosed in Japanese laid-open patent publication No. 2011-013520 cannot adjust backing sounds and click sounds in response to the output units. According to an embodiment of the present disclosure, it is possible to provide an electronic musical instrument capable of easily performing mixing for each output unit.

[Sound Signal Generation/Output Function]

A sound signal generation and output function realized by implementing a control program stored in the memory unit 103 by the control unit 101 of the electronic musical instrument 10 will be described. Some or all of the configurations implementing the sound signal generation and output functions described below may be implemented by hardware. In the present embodiment, a case where the sound source unit 102 realizes the generation and output functions of the sound signal will be described as an example. For example, the sound signal generation and output functions may be implemented by the DSP of the sound source unit 102.

Figure 2:
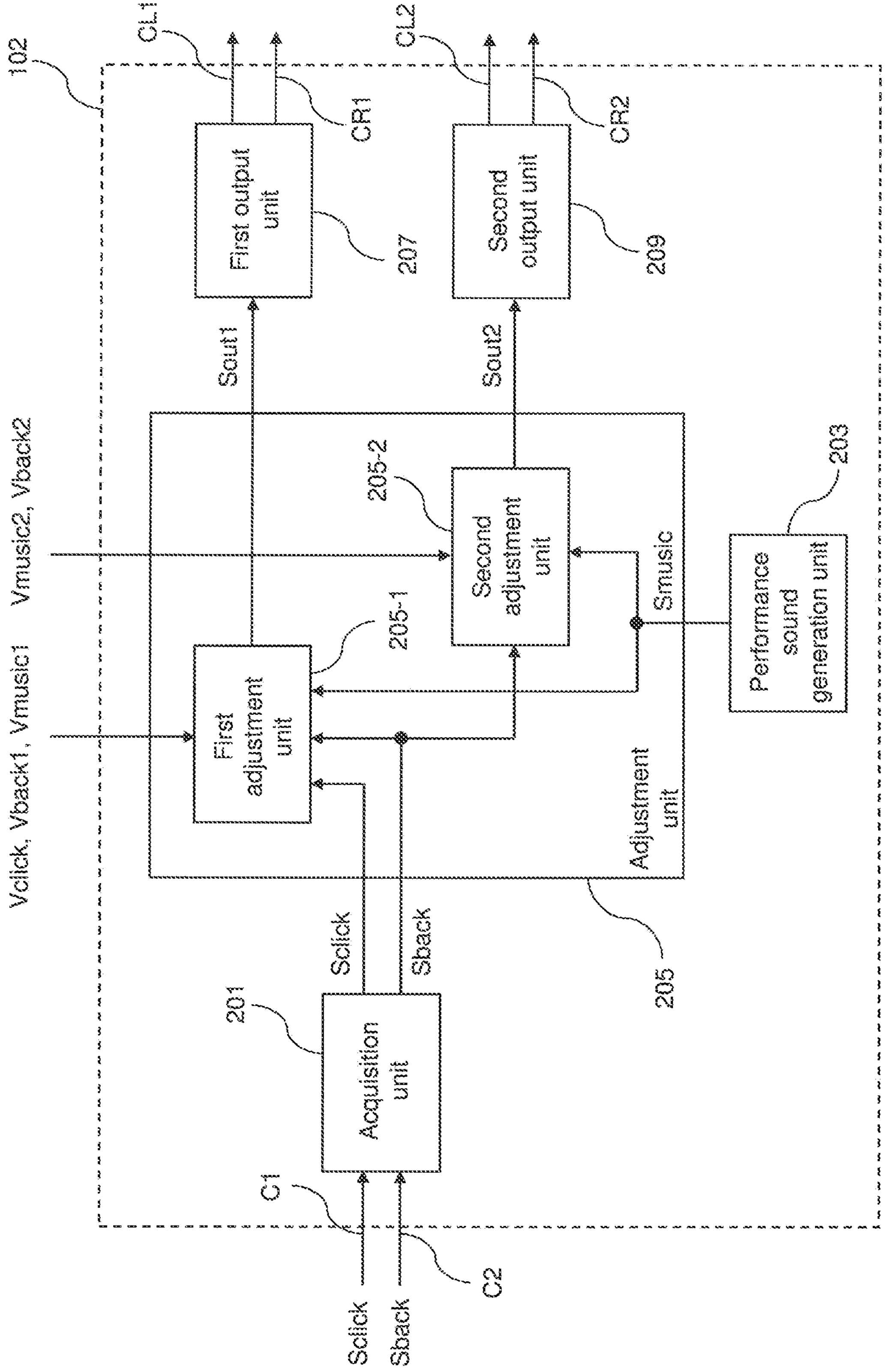
FIG. 2 is a block diagram showing a configuration of a sound source unit according to the first embodiment.

FIG. 2 is a block diagram showing a configuration of the sound source unit 102 according to the present embodiment. Referring to FIG. 2, the sound source unit 102 includes an acquisition unit 201, a performance sound generation unit 203, an adjustment unit 205, a first output unit 207, and a second output unit 209.

The acquisition unit 201 acquires a click sound signal (first sound signal) Sclick and a backing sound signal (second sound signal) Sback from the external source via the communication I/F 115. In the present embodiment, the click sound signal Sclick is a signal corresponding to a click sound corresponding to a predetermined musical piece played by a performer. The backing sound signal Sback is a signal corresponding to the accompaniment corresponding to the predetermined musical piece and/or audio of the previously recorded musical piece. The accompaniment corresponding to a musical piece and audio of a musical piece are collectively referred to as a backing sound.

The acquisition unit 201 acquires the click sound signal Sclick and the backing sound signal Sback through different first input channel C1 and second input channel C2, respectively. The first input channel C1 may correspond to an L channel and the second input channel C2 may correspond to an R channel. For example, the acquisition unit 201 may acquire the click sound signal Sclick through the first input channel C1 and acquire the backing sound signal Sback through the second input channel C2. The first input channel C1 may correspond to the R channel, and the second input channel CL2 may correspond to the L channel. The acquisition unit 201 supplies the acquired click sound signal Sclick and backing sound signal Sback to the adjustment unit 205.

The performance sound generation unit 203 generates a musical sound signal Smusic based on a performance operation input to the performance operator 113 by the performer. When the performance operation is input to the performance operator 113, event data corresponding to the performance operation is output. The performance sound generation unit 203 acquires the event data. The event data includes information indicating the type of the performance operator 113 to which the performance operation is input, and velocity indicating the strength of the performance operation input to the performance operator 113. The performance sound generation unit 203 generates the musical sound signal Smusic based on the acquired event data. More specifically, the performance sound generation unit 203 retrieves sound waveform data corresponding to the performance operator 113 from the memory unit 103 in accordance with the type of the performance operator 113 and adjusts the retrieved sound waveform data based on the velocity. The performance sound generation unit 203 supplies the adjusted sound waveform data as the musical sound signal Smusic to the adjustment unit 205.

The adjustment unit 205 receives the click sound signal Sclick and the backing sound signal Sback from the acquisition unit 201. The adjustment unit 205 also receives the musical sound signal Smusic from the performance sound generation unit 203. Further, the adjustment unit 205 acquires the setting volume information. The setting volume information is information indicating the volume of various sounds output from the electronic musical instrument 10. The setting volume information is specified by the user via the setting input unit 111. The setting volume information includes setting volume information Vclick of the click sound to be output from a headphone used by the performer, setting volume information Vback1 of the backing sound to be output from the headphone, setting volume information Vmusic1 of the musical sound to be output from the headphone, setting volume information Vmusic2 of the musical sound to be output from a speaker, and setting volume information Vback2 of the backing sound to be output from the speaker.

The adjustment unit 205 includes a first adjustment unit 205-1 and a second adjustment unit 205-2. The first adjustment unit 205-1 acquires the click sound signal Sclick, the backing sound signal Sback, and the musical sound signal Smusic, and the setting volume information Vclick of the click sound, the setting volume information Vback1 of the backing sound, and the setting volume information Vmusic1 of the musical sound. The first adjustment unit 205-1 adjusts the volume balance of the click signal Sclick, the backing sound signal Sback, and the musical sound signal Smusic based on the setting volume information Vclick, Vback1, Vmusic1, and then mixes the click sound signal Sclick, the backing sound signal Sback, and the musical sound signal Smusic whose volume balance was adjusted. The first adjustment unit 205-1 outputs a first output sound signal Sout1 generated by mixing the click sound signal Sclick, the backing sound signal Sback, and the musical sound signal Smusic to the first output unit 207.

The second adjustment unit 205-2 acquires the backing sound signal Sback, the musical sound signal Smusic, and the setting volume information Vmusic2 of the musical sound, and the setting volume information Vback2 of the backing sound. The second adjustment unit 205-2 adjusts the volume balance of the backing sound signal Sback and the musical sound signal Smusic based on the setting volume information Vmusic2, Vback2, and then mixes the backing sound signal Sback and the musical sound signal Smusic whose volume balance was adjusted. The second adjustment unit 205-2 outputs a second output sound signal Sout2 generated by mixing the backing sound signal Sback and the musical sound signal Smusic to the second output unit 209.

The first output unit 207 supplies the first output sound signal Sout1 to the headphone worn by the performer. The first output unit 207 supplies the first output sound signal Sout1 to the headphone (a first output destination) via two different channels, a first channel CL1 and a second channel CR1. The first channel CL1 may be an L channel corresponding to a speaker on the left side of the headphone. The second channel CR1 may be an R channel corresponding to a speaker on the right side of the headphone. That is, the click sound signal Sclick and the backing sound signal Sback supplied via different channels (the first input channel C1 and the second input channel C2) are mixed and output from the L channel and R channel of the headphone. In other words, the click sound based on the click sound signal Sclick supplied via the first input channel C1 corresponding to the L channel is output from the R channel as well as the L channel of the headphone, and the backing sound based on the backing sound signal Sback supplied via the second input channel C2 corresponding to the R channel is output from the L channel as well as the R channel of the headphone.

The second output unit 209 supplies the second output sound signal Sout2 to the speaker (a second output destination). The second output unit 209 supplies the second output sound signal Sout2 to the speaker via two different channels, a first channel CL2 and a second channel CR2. The first channel CL2 may be a channel corresponding to a certain speaker. The second channel CR2 may be a channel corresponding to another speaker. That is, the backing sound signal Sback supplied via the second input channel C2 and the musical sound signal Smusic are mixed and output from the two channels of the speakers. In other words, the backing sound based on the backing sound signal Sback supplied via the second input channel C2 corresponding to the R channel is output not only from the other channel of the speaker but also from the one channel of the speaker.

The example where the acquisition unit 201 acquires the click sound signal Sclick through the first input channel C1, and the backing sound signal Sback through the second input channel C2 has been described, but the backing sound signal Sback may be acquired through the first input channel C1, and the click sound signal Sclick may be acquired through the second input channel C2. The signals acquired through the first input channel C1 and the second input channel C2 can be appropriately set by the user.

In the above-described generation and output functions of the sound signal by the sound source unit 102, the acquisition unit 201 supplies the click sound signal Sclick and backing sound signal Sback acquired through the first input channel C1 and the second input channel C2, respectively, to the adjustment unit 205 in a monaural state. These signals are appropriately mixed in the adjustment unit 205 and the first output sound signal Sout1 and the second output sound signal Sout2 are generated. The generated first output sound signal Sout1 and the second output sound signal Sout2 are output as a 2-channel audio signal from the first output unit 207 and the second output unit 209, respectively. However, the present embodiment is not limited to this. For example, the acquisition unit 201 may convert the click sound signal Sclick acquired through the first input channel C1 into a two-channel audio signal and supply the converted audio signal to the adjustment unit 205. Similarly, the acquisition unit 201 may convert the backing sound signal Sback acquired through the second input channel C2 into a 2-channel audio signal and supply it to the adjustment unit 205.

Figure 3:
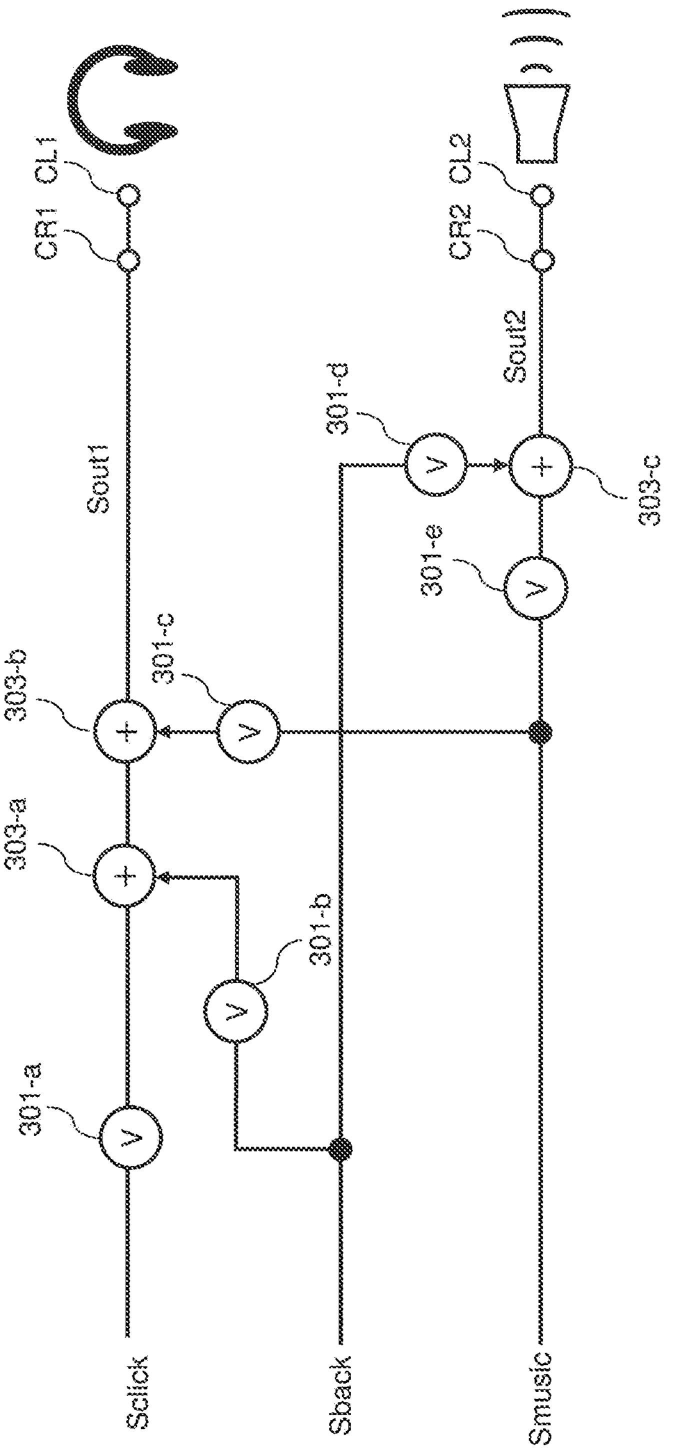
FIG. 3 is a conceptual diagram for explaining a flow of each sound signal input to the electronic musical instrument according to the first embodiment, mixed, and output.

FIG. 3 is a conceptual diagram for explaining a flow of each sound signal input to the electronic musical instrument 10, mixed, and output. As shown in FIG. 3, the first output sound signal Sout1 output from the first output unit 207 to the headphone is generated by adjusting the respective volumes of the click sound signal Sclick, the backing sound signal Sback, and the musical sound signal Smusic based on the setting volume information Vclick, Vback1, Vmusic1, and then mixing them each other. Specifically, in the first adjustment unit 205-1, the click sound signal Sclick is amplified by an amplifier 301-*a* based on the setting volume information Vclick. Similarly, the backing sound signal Sback is amplified by an amplifier 301-*b* based on the setting volume information Vback1. The musical sound signal Smusic is amplified by an amplifier 301-*c* based on the setting volume information Vmusic1. The click signal Sclick amplified by the amplifier 301-*a* and the backing sound signal Sback amplified by the amplifier 301-*b* are added by an adder 303-*a*. Furthermore, the amplified musical sound signal Smusic is added by an adder 303-*b* to the signal obtained by adding the click sound signal Sclick and the backing sound signal Sback, and the first output sound signal Sout1 is generated. The first output sound signal Sout1 is output to the headphone (the first output destination).

On the other hand, the second sound output signal Sout2 output from the second output unit 209 is generated by adjusting the respective volumes of the backing sound signal Sback and the musical sound signal Smusic based on the setting volume information Vback2, Vmusic2, and then mixing them each other. Specifically, in the second adjustment unit 205-2, the backing sound signal Sback is amplified by an amplifier 301-*d* based on the setting volume information Vback2. The musical sound signal Smusic is amplified by an amplifier 301-*e* based on the setting volume information Vmusic2. The backing sound signal Sback amplified by the amplifier 301-*d* and the musical sound signal Smusic amplified by the amplifier 301-*e* are added by an adder 303-*c* and the second output sound signal Sout2 is generated. The second output sound signal Sout2 is output to the speaker (the second output destination).

The flow of each sound signal input to the electronic musical instrument 10 according to the present embodiment, mixed and output is not limited to the flow of each sound signal described with reference to FIG. 3. In a case where the setting of the signals acquired through the first input channel C1 and the second input channel C2 is changed by the user, the flow of each sound signal mixed and output can be changed as appropriate.

Conventionally, in order to make it easier for a performer to play, not only the click sound but also the backing sound may be output to the headphone worn by the performer. In a case where the backing sound and the click sound are output from the headphone, from the viewpoint of easiness of performance of the musical instrument, it is preferable to adjust each of the volumes of the click sound and the backing sound to balance the volume that it makes easy for the performer to play. In this case, since the sound output from the headphone and the sound output from the speaker are different in the sound components and the volume balances of the respective components, the volume of each sound needs to be individually adjusted according to the output unit.

In the electronic musical instrument 10 according to the present embodiment described above, different sound signals (the click sound signal Sclick and the backing sound signal Sback) input from the external source through different channels and the musical sound signal Smusic based on the performance by the performer can be easily mixed in a mix balance desired by the performer for each output unit without using an external mixer. More specifically, in the electronic musical instrument 10, the volume of the click sound, the backing sound, and the musical sound output from the headphone worn by the performer can be individually adjusted, and the volume of the backing sound and the musical sound output from the speaker can be individually adjusted. That is, in the electronic musical instrument 10, the user can easily adjust the volume balance of each component included in the sound output from the headphone and the volume balance of each component included in the sound output from the speaker and mix the sound with a mix balance suitable for performance.

In the present embodiment described above, the case where the performer wears the headphone when playing the electronic musical instrument 10 has been described, but an earphone may be used instead of the headphone.

Figure 4:
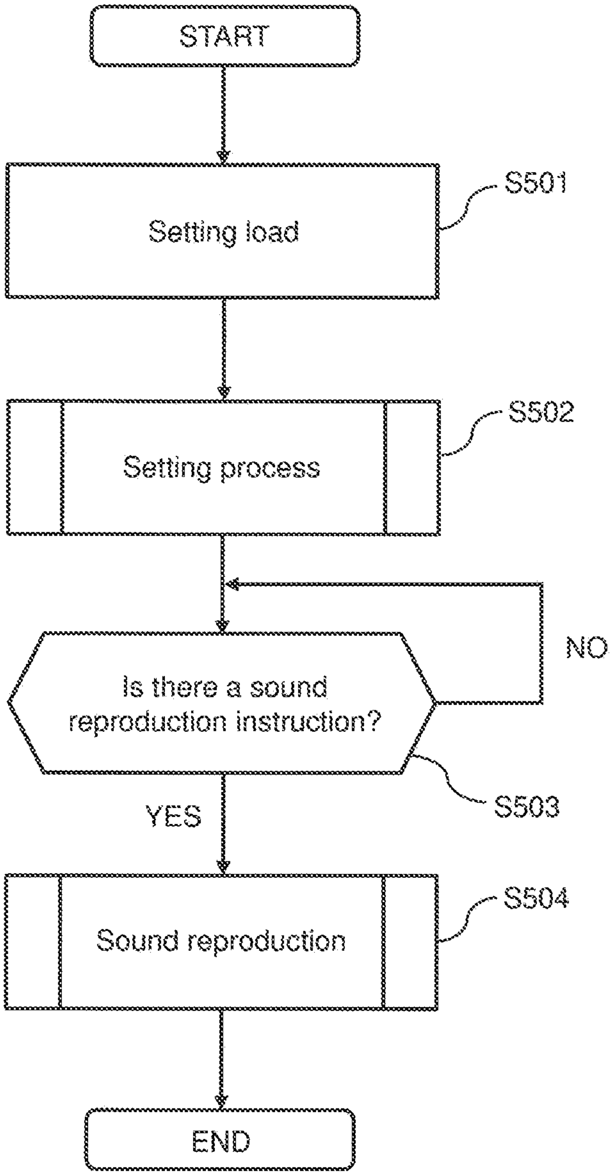
FIG. 4 is a flowchart showing a flow of a sound reproduction method by the electronic musical instrument according to the first embodiment.

FIG. 4 is a flowchart showing a flow of a sound reproduction method of the electronic musical instrument of the present disclosure. As an example, a sound reproduction method executed by the electronic musical instrument 10 according to the first embodiment will be described.

The electronic musical instrument 10 loads a setting by the user (S501). The setting is set in advance by the user before the start of sound reproduction by the electronic musical instrument 10. The setting includes, for example, the setting volume information Vclick, Vback1, Vmusic1 of each sound component (the click sound signal Sclick, the backing sound signal Sback, and the musical sound signal Smusic) included in the first output sound signal Sout1 which is output to the first output unit 207, and the setting volume information Vback2, Vmusic2 of each sound component (the backing sound signal Sback, and the musical sound signal Smusic) included in the second output sound signal Sout2 which is output to the second output unit 209. In addition, the setting by the user includes, for example, a setting information for setting the input channel of the signals to be input to the acquisition unit 201. The setting of the input channel can be set by the user in accordance with the setting of a transmission channel of the click sound signal Sclick and the backing sound signal Sback input from the external source.

Next, the electronic musical instrument 10 performs a setting process based on the loaded setting (S502). Details of the setting process will be described later. The electronic musical instrument 10 determines whether there is a sound reproduction instruction from the user (S503). When there is a sound reproduction instruction (S503; YES), the electronic musical instrument 10 reproductions a sound (S504). Sound reproduction is accomplished by the sound signal generation and output functions of the sound source unit 102 described with reference to FIG. 2. Details of sound reproduction will be described later. In a case where there is no sound reproduction instruction (S503; NO), the electronic musical instrument 10 waits for a sound reproduction instruction from the user.

Figure 5:
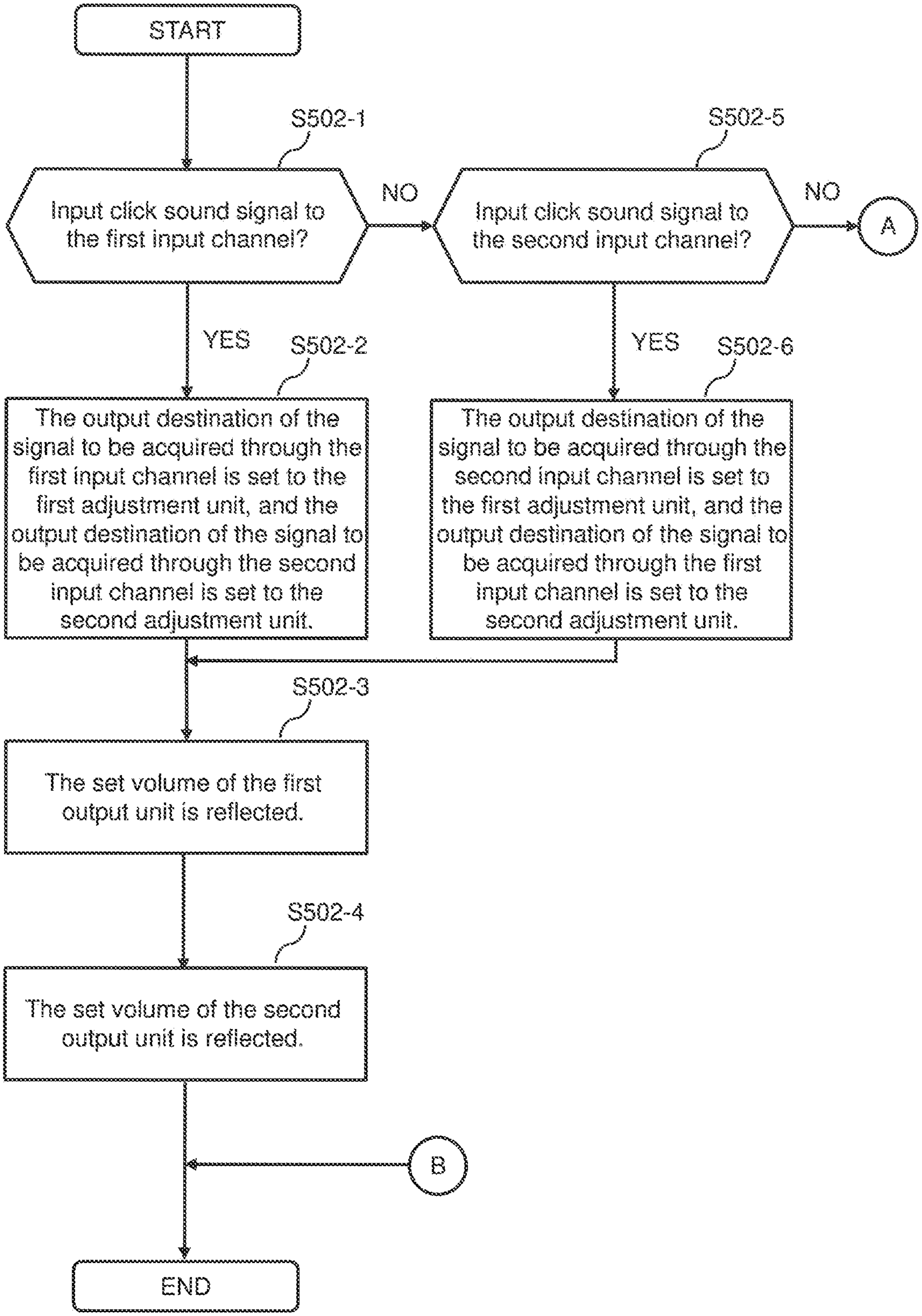
FIG. 5 is a flowchart showing a flow of a setting process shown in FIG. 4 according to the first embodiment.
Figure 6:
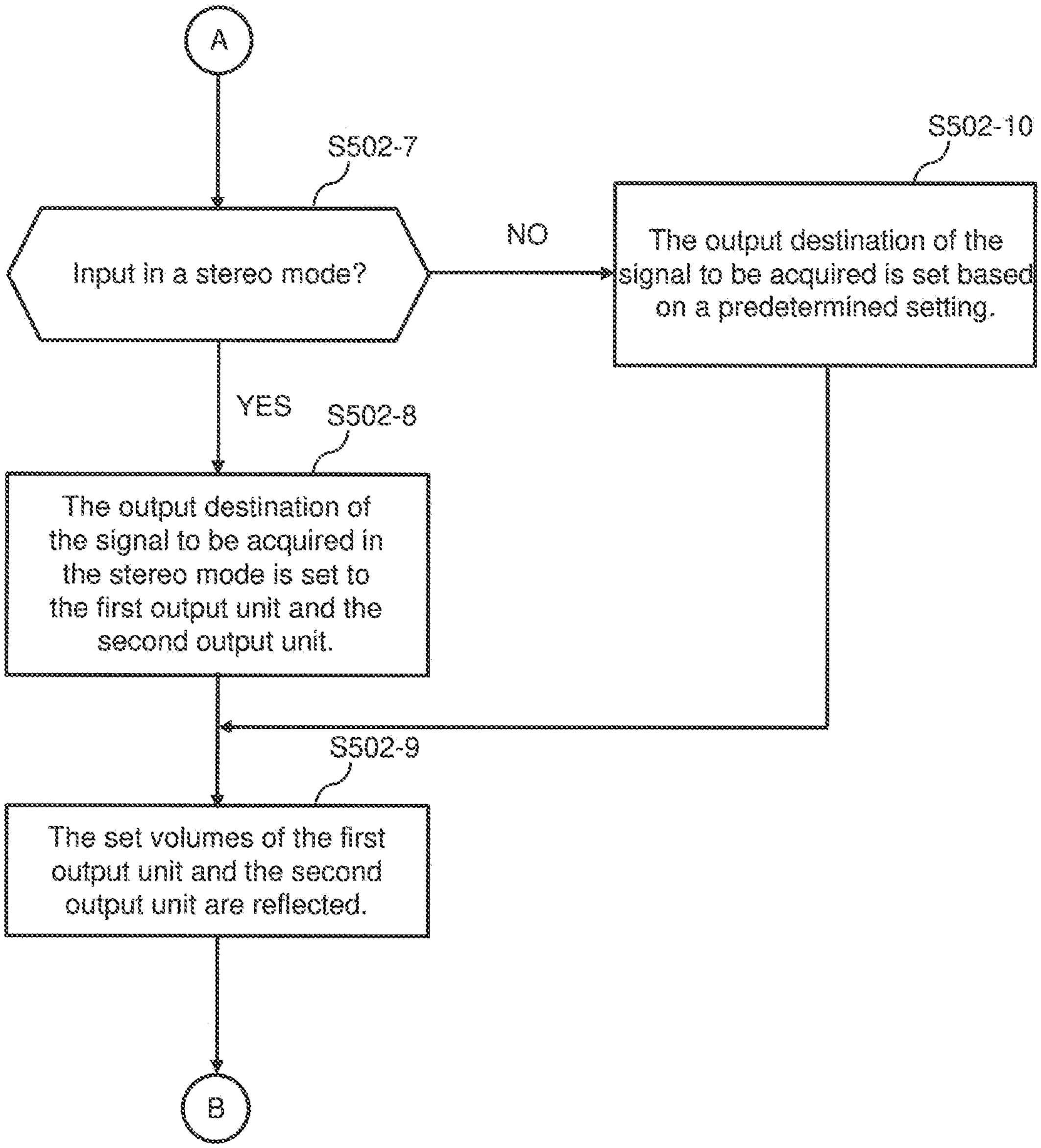
FIG. 6 is a flowchart showing a flow of a setting process shown in FIG. 4 according to the first embodiment.

FIGS. 5 and 6 are flowcharts showing flows of the setting process (S502) shown in FIG. 4. The electronic musical instrument 10 loads the setting by the user input via the setting input unit 111 (S501) and performs a setting process based on the loaded setting. The setting process (S502) may be performed by the control unit 101 or the sound source unit 102 of the electronic musical instrument 10.

As shown in FIG. 5, whether the click sound signal Sclick is input to the acquisition unit 201 through the first input channel C1 is determined based on the setting by the user (S502-1). In a case where the click sound signal Sclick is input through the first input channel C1 (S502-1; YES), the output destination of the signal to be acquired through the first input channel C1 is set to the first adjustment unit 205-1, and the output destination of the signal to be acquired through the second input channel C2 is set to the second adjustment unit 205-2 (S502-2). Next, the set volume of the first output sound signal Sout1 to be output from the first output unit 207 is reflected based on the setting volume information Vclick, Vback1, Vmusic1 (S502-3). In other words, the amplification factor of the amplifiers (the amplifiers 301-*a*, 301-*b*, 301-*c* in FIG. 3) is set based on the setting volume information Vclick, Vback1, Vmusic1. Next, the set volume of the second output sound signal Sout2 to be output from the second output unit 209 is reflected based on the setting volume information Vback2, Vmusic2 (S502-4). In other words, the amplification factor of the amplifiers (the amplifiers 301-*d*, 301-*e* in FIG. 3) is set based on the setting volume information Vback2, Vmusic2. The order of S502-3 and S502-4 may be inverted. The explanation of the present embodiment referring to FIGS. 2 and 3 is based on the assumption that the setting processes of S502-1 to S502-4 described above are performed.

In a case where the click sound signal Sclick is not input through the first input channel C1 (S502-1, NO), whether the click sound signal Sclick is input to the acquisition unit 201 through the second input channel C2 is determined based on the setting by the user (S502-5). In a case where the click sound signal Sclick is input through the second input channel C2 (S502-5; YES), the output destination of the signal to be acquired through the second input channel C2 is set to the first adjustment unit 205-1, and the output destination of the signal to be acquired through the first input channel C1 is set to the second adjustment unit 205-2 (S502-6). Thereafter, the process proceeds to S502-3.

In a case where the click sound signal Sclick is not input through the second input channel C2 (S502-5; NO), as shown in FIG. 6, it is determined whether the signal is input in a stereo mode (S502-7). In this case, the signal to be input may be audio data. In a case where the signal is input in the stereo mode (S502-7; YES), the output destination of the signal to be acquired in the stereo mode is set to the first output unit 207 and the second output unit 209 (S502-8). Thereafter, the set volume of the sound signal to be output from the first output unit 207 and the set volume of the sound signal to be output from the second output unit 209 are reflected based on the setting by the user (S502-9).

In a case where the signal is not input in the stereo mode (S502-7; NO), the output destination of the signal to be acquired is set based on a predetermined setting (S502-10). Thereafter, the process proceeds to S502-9. The sound source unit 102 may include a different processing circuit than the configuration of the sound source unit 102 shown in FIG. 2, and subsequent process after S502-7 described above may be processed by the different processing circuit.

Figure 7:
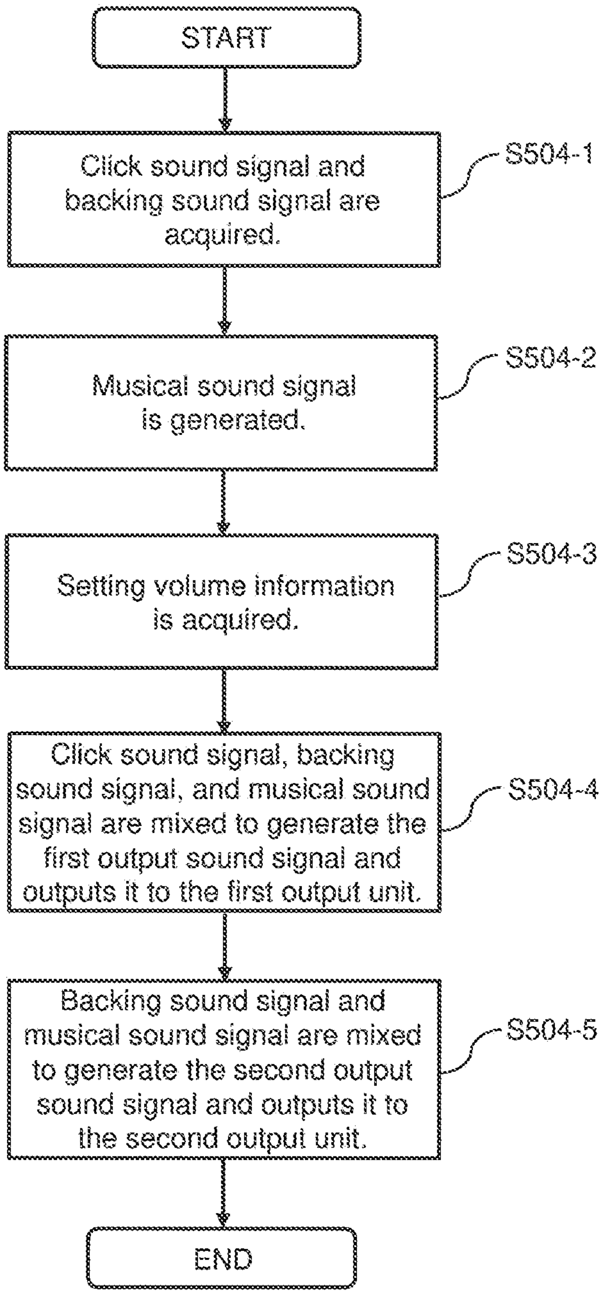
FIG. 7 is a flowchart showing a flow of a sound reproduction shown in FIG. 4 according to the first embodiment.

FIG. 7 is a flowchart showing a flow of the sound reproduction (S504) shown in FIG. 4. The process sound reproduction is implemented by the sound source unit 102 of the electronic musical instrument 10. As shown in FIG. 7, the click sound signal Sclick and the backing sound signal Sback are acquired from the external source (S504-1). Next, the musical sound signal Smusic is generated based on the performance operation by the performer input to the performance operator 113 (S504-2).

Next, the setting volume information specified by the user via the setting input unit 111 is acquired (S504-3). Subsequently, in the first adjustment unit 205-1, the click sound signal Sclick, the backing sound signal Sback, and the musical sound signal Smusic are mixed based on the setting volume information to generate the first output sound signal Sout1 and outputs it to the first output unit 207 (S504-4). Subsequently, in the second adjustment unit 205-2, the backing sound signal Sback and the musical sound signal Smusic are mixed based on the setting volume information to generate the second output sound signal Sout2 and outputs it to the second output unit 209 (S504-5). The order of the process of S504-4 and S504-5 may be inverted or may be simultaneous.

Second Embodiment

In the first embodiment described above, the case where the performance data (the click sound signal Sclick corresponding to the click sound and the backing sound signal Sback corresponding to the backing sound) input from the external source through different channels and the performance sound by the performer are mixed has been described.

However, the invention of the present disclosure is not limited to this, and performance data stored in advance in the electronic musical instrument may be mixed with the performance sound by the performer and supplied to the headphone and the speaker worn by the performer with different volume balances.

[Configuration of Electronic Musical Instrument]

An electronic musical instrument 10A according to the second embodiment of the present disclosure is a device having a function of outputting sounds in response to a performance operation by a performer, and outputting click sounds and backing sounds in accordance with performance data stored in advance and performance data acquired from an external source. Similar to the first embodiment described above, in the present embodiment, a case where the electronic musical instrument 10A is an electronic drum device will be described as an example. The configuration of the electronic musical instrument 10A in the present embodiment is substantially the same as that of the electronic musical instrument 10 according to the first embodiment described referring to FIG. 1, and therefore, illustration thereof is omitted.

Since the respective configurations of the electronic musical instrument 10A are substantially the same as the respective configurations of the electronic musical instrument 10 according to the first embodiment described referring to FIG. 1 except for a memory unit 103*a* and a sound source unit 102*a*, drawings showing the respective configurations of the electronic musical instrument 10A are omitted, and duplicated descriptions are omitted.

In the present embodiment, the memory unit 103*a* of the electronic musical instrument 10A stores a click sound signal Sclick (second sound signal Sclick) corresponding to the click sound. The sound source unit 102*a* realizes the sound signal generation and output functions by using the click sound signal Sclick corresponding to the click sound stored in advance in the memory unit 103*a*.

[Sound Signal Generation/Output Function]

The sound signal generation and output function realized by implementing a control program stored in the memory unit 103*a* by the control unit 101 of the electronic musical instrument 10A will be described. Some or all of the configurations implementing the sound signal generation and output functions described below may be implemented by hardware. In the present embodiment, as an example, a case where the sound source unit 102*a* realizes the generation and output functions. For example, the sound signal generation and output functions may be implemented by the DSP of the sound source unit 102*a*.

Figure 8:
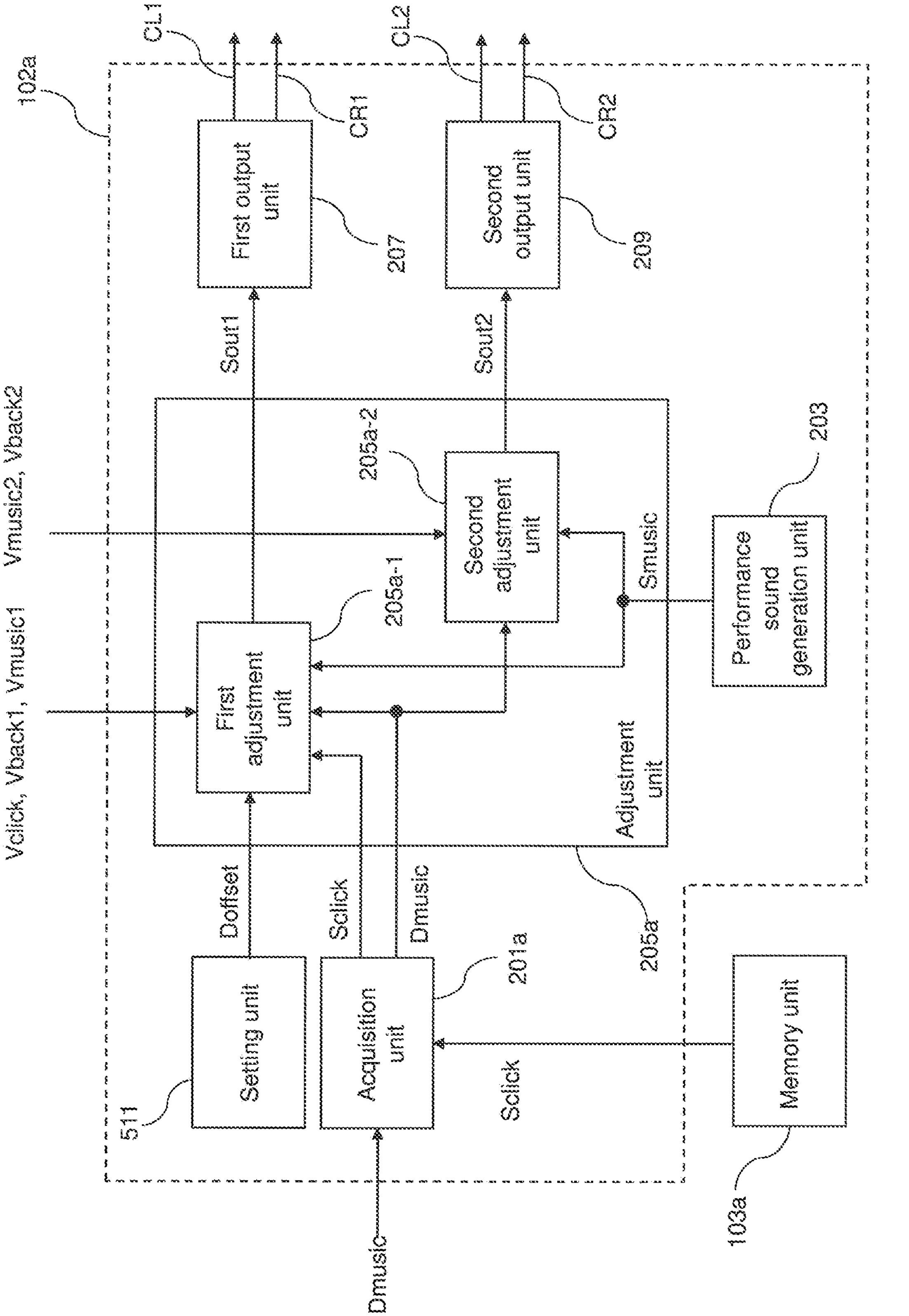
FIG. 8 is a block diagram showing a configuration of a sound source unit according to the second embodiment.

FIG. 8 is a block diagram showing a configuration of the sound source unit 102*a* in the present embodiment. Referring to FIG. 8, the sound source unit 102*a* includes an acquisition unit 201*a*, the performance sound generation unit 203, an adjustment unit 205*a*, a setting unit 511, the first output unit 207, and the second output unit 209.

The acquisition unit 201*a* acquires performance data Dmusic from the external source. The acquisition unit 201*a* may acquire the performance data Dmusic via the communication I/F 115. Although not shown, the acquisition unit 201*a* may acquire the performance data Dmusic stored in advance in a USB memory. The performance data Dmusic includes timbre data indicating timbre setting of the electronic musical instrument 10A corresponding to the music to be played, tempo data indicating the tempo of the music to be played, and audio data including the backing sound signal Sback (first sound signal Sback) corresponding to the backing sound of the music to be player.

The acquisition unit 201*a* may acquire a performance data set including multiple performance data Dmusic corresponding to a plurality of pieces of music. The performance data set may include the multiple performance data Dmusic in an order of performance. The performance data set may include the multiple performance data Dmusic in an order of difficulty of the musical piece. The user can select and use a desired performance data Dmusic from the performance data set.

Figure 9:
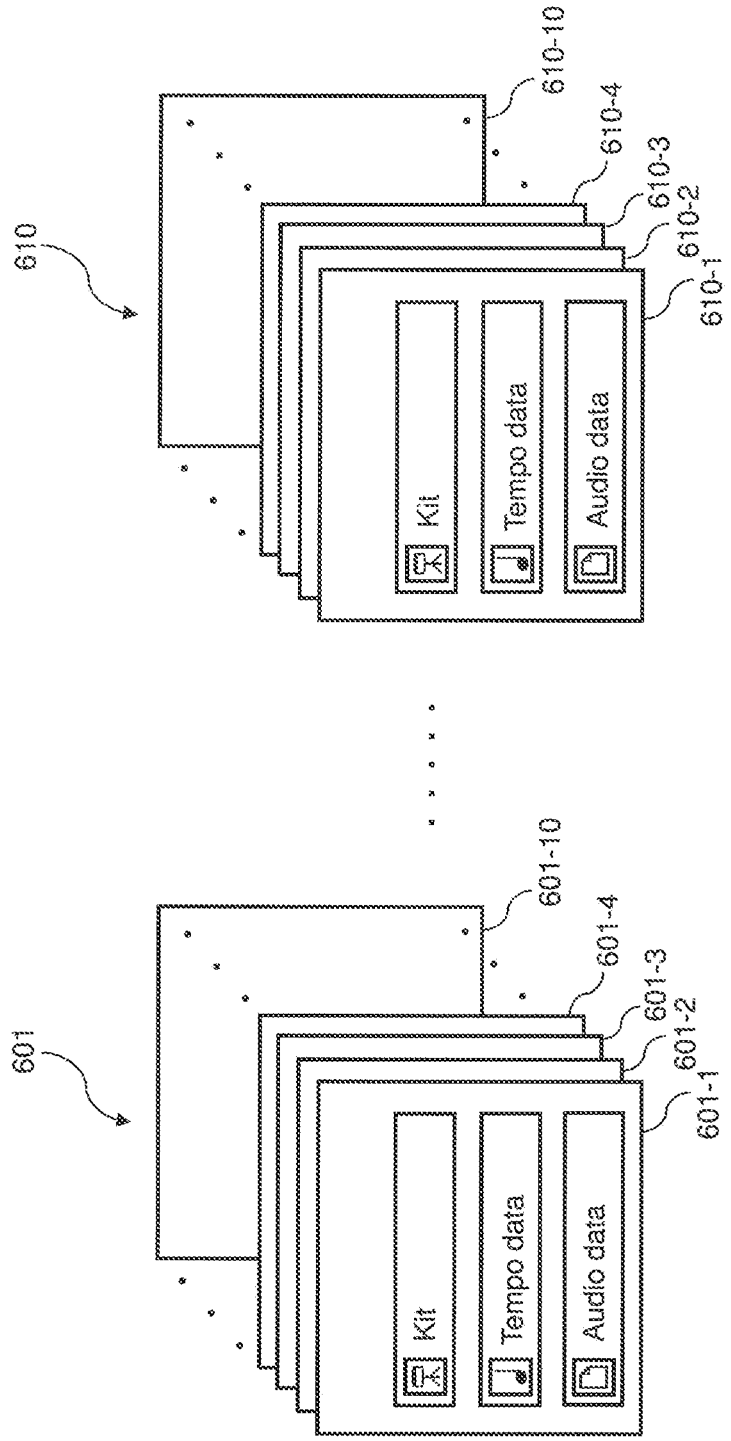
FIG. 9 is a conceptual diagram for explaining a performance data set.

FIG. 9 is a conceptual diagram for explaining a performance data set. The performance data set may be editable by the user and may be previously created by the user and stored in the memory unit 103 before using the electronic musical instrument 10A. In FIG. 9, ten performance data sets 601 to 610 are shown. The number of performance data sets is optional.

Each of the performance data sets 601 to 610 includes multiple performance data. Since the configurations of the performance data sets 601 to 610 are substantially the same as each other, only the performance data set 601 will be described here. The performance data set 601 includes, for example, multiple performance data 601-1 to 601-10.

The performance data 601-1 to 601-10 are data of musical pieces to be played by the electronic musical instrument 10A. The order of performance data 601-1 to 601-10 corresponds to the order played by the electronic musical instrument 10A. The order of the performance data 601-1 to 601-10 can be changed based on the input operation of the user. As described above, the order of the performance data 601-1 to 601-10 is not limited to the order played by the electronic musical instrument 10A and maybe in the order of the difficulty of performance.

Each of the performance data 601-1 to 601-10 may include kit, tempo data, and audio data. The kit is timbre data indicating timbre settings of the electronic musical instrument 10A. For example, in a case where the performance data 601-1 is selected, the timbre of the musical sound of the electronic musical instrument 10A is determined based on the kit included in the performance data 601-1. The tempo data is data indicating the tempo of a musical piece corresponding to each of the performance data 601-1 to 601-10. For example, in a case where the click sound is output when the performance data 601-1 is selected, the tempo of the click sound is determined based on the tempo data included in the performance data 601-1. In a case where the performance data 601-1 is played, the audio data included in the performance data 601-1 is played. The audio data includes the backing sound signal Sback.

The kit, tempo data, and audio data included in each of the performance data 601-1 to 601-10 are different for each performance data 601-1 to 601-10. By collectively managing the kit, tempo data, and audio data for each musical piece as the performance data 601-1 to 601-10, it is possible to easily switch the musical piece and change the music order.

Return to the description of the configuration of the sound source unit 102*a* with reference to FIG. 8. The acquisition unit 201*a* acquires the click sound signal Sclick corresponding to the click sound from the memory unit 103*a*. The acquisition unit 201*a* supplies the acquired performance data Dmusic and the click sound signal Sclisck to the adjustment unit 205*a*.

The performance sound generation unit 203 generates the musical sound signal Smusic based on a performance event input to the performance operator 113 by the performer. When the performance event is input to the performance operator 113, event data corresponding to the performance event is output. The performance sound generation unit 203 acquires the event data. The event data includes information indicating the type of the performance operator 113 to which the performance event is input, and velocity indicating the strength of the performance event input to the performance operator 113. The performance sound generation unit 203 generates the musical sound signal Smusic based on the acquired event data. More specifically, the performance sound generation unit 203 retrieves the sound waveform data corresponding to the performance operator 113 from the memory unit 103*a* in accordance with the type of the performance operator 113 and adjusts the retrieved sound waveform data based on the velocity. The performance sound generation unit 203 supplies the adjusted sound waveform data to the adjustment unit 205*a* as the musical sound signal Smusic.

The setting unit 511 sets an offset period corresponding to the time difference of the output timing of the click sound signal Sclisck with respect to the output timing of the backing sound signal Sback. The setting unit 511 sets the offset period based on the operation of the user input in advance via the setting input unit 111. The setting unit 511 supplies offset data Doffset indicating the set offset period to the adjustment unit 205*a*. In a case where the output timing of the output timing of the backing sound signal Sback and the output timing of the click sound signal Sclisck are synchronized, i.e., the output timings of the two sound signals are matched, the setting by the setting unit 511 can be omitted.

The adjustment unit 205*a* receives the performance data Dmusic and the click sound signal Sclisck from the acquisition unit 201*a*. The adjustment unit 205*a* also receives the musical sound signal Smusic from the performance sound generation unit 203. Further, the adjustment unit 205*a* receives the setting volume information. The setting volume information includes the setting volume information Vclick of the click sound to be output from the headphone, the setting volume information Vback1 of the backing sound to be output from the headphone, the setting volume information Vmusic1 of the musical sound to be output from the headphone, the setting volume information Vmusic2 of the musical sound to be output from the speaker, and the setting volume information Vback2 of the backing sound to be output from the speaker. The setting volume information is specified by the user via the setting input unit 111. Further, the adjustment unit 205*a* receives the offset data Doff set from the setting unit 511.

The adjustment unit 205*a* includes a first adjustment unit 205*a*-1 and a second adjustment unit 205*a*-2. The first adjustment unit 205*a*-1 acquires the click sound signal Sclick, and the performance data Dmusic including the backing sound signal Sback and the tempo data, the offset data Doffset, the musical sound signal Smusic, and the setting volume information Vclick, Vback1, Vmusic1. The first adjustment unit 205*a*-1 adjusts the tempo of the click sound signal Sclick based on the tempo data. The first adjustment unit 205*a*-1 mixes the click sound signal Sclick, the backing sound signal Sback, and the musical sound signal Smusic based on the setting volume information Vclick, Vback1, Vmusic1, and the offset data Doffset.

The first adjustment unit 205*a*-1 adjusts the output timing of the click sound signal Sclick and the output timing of the backing sound signal Sback based on the offset data Doffset. Specifically, the first adjustment unit 205*a*-1 sets the criterion of the click sound, that is, a reproduction start point of the click sound after the offset period based on the offset data Doffset has elapsed since the reproduction starts. The user can determine the offset period based on the reproduction start point of the backing sound included in the performance data Dmusic acquired in advance and set the offset data Doffset for specifying the determined offset period. The first adjustment unit 205*a*-1 outputs the first output sound signal Sout1 generated by mixing the click sound signal Sclick, the backing sound signal Sback, and the musical sound signal Smusic to the first output unit 207. In a case where a pre-count is generated and output, the pre-count starts retroactively with reference to the reproduction start point of the click sound.

In a case where the output timing of the click signal Sclisck and the output timing of the backing sound signal Sback are synchronized, i.e., the output timings of the two sound signals are matched, adjustment of the timing of the output of the click sound signal Sclick and the timing of the output of the backing sound signal Sback, and adjustment of the tempo of the click sound signal Sclick based on the tempo data by the first adjustment unit 205*a*-1 can be omitted.

The second adjustment unit 205*a*-2 acquires the performance data Dmusic including the backing sound signal Sback, the musical sound signal Smusic, and the setting volume information Vmusic2, Vback2. The second adjustment unit 205*a*-2 mixes the backing sound signal Sback and the musical sound signal Smusic based on the setting volume information Vmusic2, Vback2. The second adjustment unit 205*a*-2 outputs the second output sound signal Sout2 generated by mixing the backing sound signal Sback and the musical sound signal Smusic to the second output unit 209.

The first output unit 207 supplies the first output sound signal Sout1 to the headphone worn by the performer. The first output unit 207 supplies the first output sound signal Sout1 to the headphone via two different channels, first channel CL1 and second channel CR1. The first channel CL1 may be a channel corresponding to a speaker on the left side of the headphone. The second channel CR1 may be a channel corresponding to a speaker on the right side of the headphone.

The second output unit 209 supplies the second output sound signal Sout2 to the speaker. The second output unit 209 supplies the second output sound signal Sout2 to the speaker via two different channels, first channel CL2 and second channel CR2. The first channel CL2 may be a channel corresponding to a certain speaker. The second channel CR2 may be a channel corresponding to another speaker.

In the electronic musical instrument 10A according to the present embodiment described above, the sound signals stored in advance in the electronic musical instrument 10A and the musical sounds by the performer can be easily mixed in a mix balance desired by the performer for each output unit without using an external mixer. More specifically, in the electronic musical instrument 10A, the tempo of the click sound stored in advance in the electronic musical instrument 10A is adjusted based on the performance data. Further, in the electronic musical instrument 10A, the volumes and output timings of the click sounds, backing sounds, and performance sounds to be output from the headphone worn by the performer can be individually adjusted, and the volumes of the backing sounds and performance sounds to be output from the speaker can be individually adjusted.

In the present embodiment, the click sound signal corresponding to the click sound is exemplified as the sound signal stored in advance in the electronic musical instrument 10A. However, the sound signal stored in advance in the electronic musical instrument 10A is not limited to the sound signal corresponding to the click sound, the backing sound signal corresponding to the backing sound may be stored in advance in the electronic musical instrument 10A. In this case, the user may select the corresponding backing sound signal Sback based on the acquired performance data Dmusic.

In the present embodiment described above, the case where the performer wears the headphone when playing the electronic musical instrument 10A has been described, but an earphone may be used instead of the headphone.

The sound reproduction method described referring to FIG. 4 can also be applied to a sound reproduction method implemented by the electronic musical instrument 10A according to the second embodiment. In a case where the sound reproduction method shown in FIG. 4 is implemented by the electronic musical instrument 10A according to the second embodiment, the setting to be loaded by the electronic musical instrument 10A in S501 includes the offset data Doffset in addition to the setting volume information Vclick, Vback1, Vmusic2, Vmusic1, Vback2. The electronic musical instrument 10A then reproductions a sound (S504). Sound reproduction is realized by the sound signal generation and output function by the sound source unit 102*a* described referring to FIG. 5. In the sound reproduction method implemented by the electronic musical instrument 10A according to the second embodiment, the setting process is different from the setting process in the sound reproduction method according to the first embodiment shown in FIG. 5.

Figure 10:
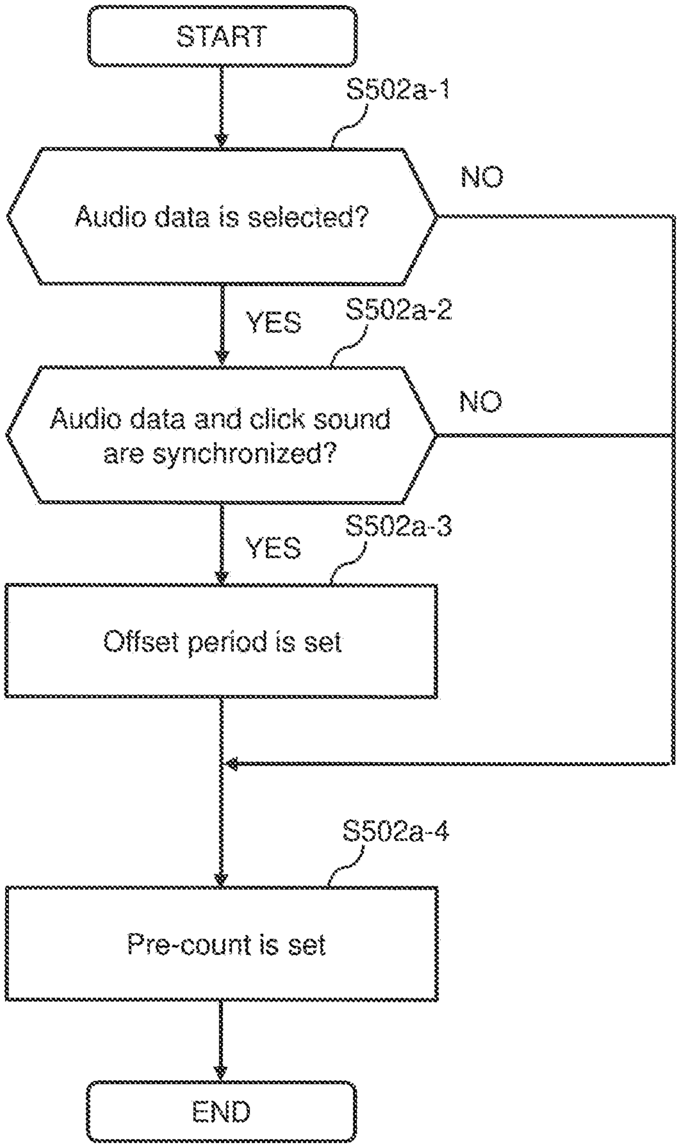
FIG. 10 is a flowchart showing a flow of a setting process shown in FIG. 4 according to the second embodiment.

FIG. 10 is a flow chart showing a flow of the setting process shown in FIG. 4 (S502) in the second embodiment. The electronic musical instrument 10A loads the setting input by the user via the setting input unit 111 (S501) and implements a setting process based on the loaded setting. The setting process (S502) may be implemented by the control unit 101 or the sound source unit 102*a* of the electronic musical instrument 10A.

First, based on the user's setting, it is determined whether audio data is selected (S502*a*-1). That is, it is determined whether audio data is included in the selected performance data. In a case where audio data is selected (S502*a*-1, YES), based on the user's setting, it is determined whether the audio data and the click sound are synchronized (S502*a*-2).

In a case where the audio data and the click sound are synchronized (S502*a*-2; YES), an offset period corresponding to the time difference of the output timing of the click sound signal Sclisck with respect to the output timing of the backing sound signal Sback is set based on the setting predetermined by the user (S502*a*-3). Next, a pre-count is set based on the tempo data (S502*a*-4). Pre-count refers to a function of counting only a predetermined number of measures before reproducing the audio data. In this case, the time from the start of the pre-count to the start of reproduction of the audio data may be calculated. Further, it may be set up to generate the pre-count and also to stop the pre-count. For example, the click sound may be set to stop after counting by a predetermined number of measures, or the click sound may be set to continue to sound after counting. It may be set so that the click sound stops after the pre-count.

In a case where the audio data is not selected in **S502*a*-1 (S502*a*-1; NO), and in a case where the audio data and the click sound are not synchronized in S502*a*-2 (S502*a*-2; NO), the process proceeds to S502*a*-4**.

According to an embodiment of the present disclosure, there is provided an electronic device including at least one memory configured to store executable instructions; and a processor configured to execute the executable instructions stored in the at least one memory to cause the electronic device to acquire a first sound signal from an external source, to generate a musical sound signal according to a performance operation, to output the first sound signal and the musical sound signal to a first output destination, and to output the musical sound signal to a second output destination different from the first output destination.

The first sound signal is a click sound signal.

The first sound signal and the musical sound signal are mixed together before being output to the first output destination, and the musical sound signal is output to the second output destination without being mixed with the first sound signal.

The processor is configured to execute the executable instructions stored in the at least one memory to further cause the electronic device to acquire a second sound signal from the external source, to mix the second sound signal with the first sound signal and the musical sound signal, and to output the second sound signal, the first sound signal, and the musical sound signal having been mixed together to the first output destination.

The second sound signal is a backing sound signal.

The first sound signal is acquired through a first channel, and the second sound signal is acquired through a second channel.

The first sound signal, the second sound signal, and the musical sound signal having been mixed together are output to the first output destination via a first channel and a second channel different from the first channel.

The second sound signal and the musical sound signal are mixed together before being output to the second output destination.

According to another embodiment of the present disclosure, there is provided an electronic device including at least one memory configured to store executable instructions; and a processor configured to execute the executable instructions stored in the at least one memory to cause the electronic device to acquire a first sound signal from an external source, to generate a musical sound signal according to a performance operation, to output the first sound signal and the musical sound signal to a first output destination, to output the first sound signal, a second sound signal corresponding to the first sound signal to a second output destination different from the first output destination, and to adjust an output timing of the first sound signal and an output timing of the second sound signal. The electronic device may further be configured as follows.

The first sound signal is a backing sound signal, and the second sound signal is a click sound signal.

The processor is configured to execute the executable instructions stored in the at least one memory to further cause the electronic device to set an offset period based on an input operation, and the offset period corresponds to a time difference between the output timing of the second sound signal relative to the output timing of the first sound signal.

The first sound signal and the musical sound signal are mixed together before being output to the first output destination, and the first sound signal, the second sound signal, and the musical sound signal are mixed together before being output to the second output destination.

The first sound signal, the second sound signal, and the musical sound signal having been mixed together are output to the second output destination via a first channel and a second channel different from the first channel.

According to another embodiment of the present disclosure, there is provided an electronic drum including one or more pads having a striking surface, and any of the electronic devices, wherein the electronic device is configured to generate the musical sound signal in response to the performance operation to being received by the striking surface of the one or more pads.

According to another embodiment of the present disclosure, there is provided a sound reproduction method including acquiring a first sound signal from an external source, generating a musical sound signal according to a performance operation, outputting the first sound signal and the musical sound signal to a first output destination, and outputting the musical sound signal to a second output destination. The sound reproduction method may be further configured as follows.

The first sound signal is a click sound signal.

The sound reproduction method, wherein the first sound signal and the musical sound signal are mixed together before being output to the first output destination, and the musical sound signal is output to the second output destination without being mixed with the first sound signal.

The method further including acquiring a second sound signal from the external source, wherein the first sound signal, the second sound signal, and the musical sound signal are mixed together before being output to the first output destination, and the second sound signal is a backing sound signal.

According to another embodiment of the present disclosure, there is provided a sound reproduction method including: acquiring a first sound signal from an external source; generating a musical sound signal according to a performance operation; outputting the first sound signal and the musical sound signal to a first output destination; outputting the first sound signal, a second sound signal corresponding to the first sound signal and the musical sound signal to a second output destination different from the first output destination; and adjusting an output timing of the first sound signal and an output timing of the second sound signal, wherein the first sound signal is a backing sound signal, and the second sound signal is a click sound signal.

What is claimed is:

1. An electronic musical instrument comprising:

a performance operator configured to receive a performance operation;

at least one memory configured to store executable instructions; and a processor configured to execute the executable instructions stored in the at least one memory to cause the electronic musical instrument to:

acquire a click sound signal through a first channel from an external source via a communication interface;

acquire a backing sound signal through a second channel different from the first channel from the external source via the communication interface, simultaneously with acquiring the click sound signal;

generate a musical sound signal according to the performance operation received by the performance operator;

acquire setting volume information of a click sound corresponding to the click sound signal, setting volume information of a first backing sound corresponding to the backing sound signal, setting volume information of a second backing sound corresponding to the backing sound signal, setting volume information of a first musical sound corresponding to the musical sound signal, and setting volume information of a second musical sound corresponding to the musical sound signal;

adjust a first volume balance of the click sound signal, the backing sound signal, and the musical sound signal based on the setting volume information of the click sound corresponding to the click sound signal, the setting volume information of the first backing sound corresponding to the backing sound signal, and the setting volume information of the first musical sound corresponding to the musical sound signal, respectively;

mix the click sound signal, the backing sound signal, and the musical sound signal whose first volume balance has been adjusted to obtain a first output sound signal and output the first output sound signal to a first output destination;

adjust a second volume balance of the backing sound signal and the musical sound signal based on the setting volume information of the second backing sound corresponding to the backing sound signal and the setting volume information of the second musical sound corresponding to the musical sound signal, respectively; and mix the backing sound signal and the musical sound signal whose second volume balance has been adjusted to obtain a second output sound signal that excludes the click sound signal and output the second output sound signal excluding the click sound signal to a second output destination different from the first output destination.

2. The electronic musical instrument according to claim 1, wherein the first output sound signal is output to the first output destination via a first output channel and a second output channel different from the first output channel.

3. The electronic musical instrument according to claim 1, wherein the click sound signal, the backing sound signal, and the musical sound signal whose first volume balance has been adjusted are mixed to obtain the first output sound signal, and the backing sound signal and the musical sound signal whose second volume balance has been adjusted are mixed to obtain the second output sound signal that excludes the click sound signal, by the electronic musical instrument without utilizing an external mixer.

4. An electronic musical instrument comprising:

a performance operator configured to receive a performance operation;

at least one memory configured to store executable instructions; and a processor configured to execute the executable instructions stored in the at least one memory to cause the electronic musical instrument to:

acquire a click sound signal through a first channel from an external source via a communication interface;

acquire a backing sound signal through a second channel different from the first channel from the external source via the communication interface, simultaneously with acquiring the click sound signal;

generate a musical sound signal according to the performance operation received by the performance operator;

mix the click sound signal, the backing sound signal, and the musical sound signal to obtain a first output sound signal and output the first output sound signal to a first output destination; and mix the backing sound signal and the musical sound signal to obtain a second output sound signal that excludes the click sound signal and then output the second output sound signal excluding the click sound signal to a second output destination different from the first output destination, wherein the click sound signal, the backing sound signal, and the musical sound signal are mixed to obtain the first output sound signal, and the backing sound signal and the musical sound signal are mixed to obtain the second output sound signal that excludes the click sound signal, by the electronic musical instrument without utilizing an external mixer.

5. The electronic musical instrument according to claim 4, wherein the processor is configured to execute the executable instructions stored in the at least one memory to cause the electronic musical instrument to acquire the click sound signal and the backing sound signal from the external source via the communication interface in response to a sound reproduction instruction that causes reproduction of a sound.

6. The electronic musical instrument according to claim 5, wherein the processor is configured to execute the executable instructions stored in the at least one memory to cause the electronic musical instrument to mix the click sound signal, the backing sound signal, and the musical sound signal to obtain the first output sound signal and output the first output sound signal to the first output destination in response to acquiring the click sound signal and the backing sound signal from the external source via the communication interface.

7. The electronic musical instrument according to claim 6, wherein the processor is configured to execute the executable instructions stored in the at least one memory to cause the electronic musical instrument to mix the backing sound signal and the musical sound signal to obtain the second output sound signal that excludes the click sound signal and output the second output sound signal excluding the click sound signal to the second output destination different from the first output destination in response to acquiring the click sound signal and the backing sound signal from the external source via the communication interface.

8. The electronic musical instrument according to claim 4, wherein the processor is configured to execute the executable instructions stored in the at least one memory to cause the electronic musical instrument to acquire (i) setting volume information of a click sound corresponding to the click sound signal and (ii) setting volume information of a backing sound corresponding to the backing sound signal before acquiring (iii) the click sound signal through the first channel from the external source via the communication interface and (iv) the backing sound signal through the second channel from the external source via the communication interface.

9. The electronic musical instrument according to claim 1, wherein the processor is configured to execute the executable instructions stored in the at least one memory to cause the electronic musical instrument to acquire the click sound signal and the backing sound signal from the external source via the communication interface in response to a sound reproduction instruction that causes reproduction of a sound.

10. The electronic musical instrument according to claim 9, wherein the processor is configured to execute the executable instructions stored in the at least one memory to cause the electronic musical instrument to mix the click sound signal, the backing sound signal, and the musical sound signal whose first volume balance has been adjusted to obtain the first output sound signal and output the first output sound signal to the first output destination in response to acquiring the click sound signal and the backing sound signal from the external source via the communication interface.

11. The electronic musical instrument according to claim 10, wherein the processor is configured to execute the executable instructions stored in the at least one memory to cause the electronic musical instrument to mix the backing sound signal and the musical sound signal whose second volume balance has been adjusted to obtain the second output sound signal that excludes the click sound signal and output the second output sound signal excluding the click sound signal to the second output destination different from the first output destination in response to acquiring the click sound signal and the backing sound signal from the external source via the communication interface.

12. The electronic musical instrument according to claim 1, wherein the processor is configured to execute the executable instructions stored in the at least one memory to cause the electronic musical instrument to acquire (i) the setting volume information of the click sound corresponding to the click sound signal, (ii) the setting volume information of the first backing sound corresponding to the backing sound signal, and (iii) the setting volume information of the second backing sound corresponding to the backing sound signal before acquiring (iv) the click sound signal through the first channel from the external source via the communication interface and (v) the backing sound signal through the second channel from the external source via the communication interface.

* * * * *